United States Patent [19]

Akita et al.

[11] 4,362,982

[45] Dec. 7, 1982

[54] VOLTAGE REGULATOR FOR VEHICLES

[75] Inventors: Yoshio Akita, Ichinomiya; Toshinori Maruyama, Kariya; Katsuya Muto, Okazaki, all of Japan

[73] Assignee: Nippondenso Co., Ltd., Kariya, Japan

[21] Appl. No.: 281,494

[22] Filed: Jul. 8, 1981

[30] Foreign Application Priority Data

Jul. 11, 1980 [JP] Japan ............................ 55/94628

[51] Int. Cl.³ .................................................. H02J 7/00
[52] U.S. Cl. ........................................... 320/64; 322/28; 322/99
[58] Field of Search ................ 320/48, 61, 64, 68; 322/28, 99

[56] References Cited

U.S. PATENT DOCUMENTS

| | | | |
|---|---|---|---|
| 3,984,755 | 10/1976 | Lehnhoff et al. | 322/28 |
| 4,000,453 | 12/1976 | Sheldrake et al. | 320/64 X |
| 4,019,120 | 4/1977 | Fattic | 322/99 X |
| 4,041,369 | 8/1977 | King et al. | 320/64 X |
| 4,141,613 | 2/1979 | Mori et al. | 320/64 X |
| 4,286,205 | 8/1981 | Watrous | 320/64 X |
| 4,316,134 | 2/1982 | Balan et al. | 320/64 X |

*Primary Examiner*—William M. Shoop

*Attorney, Agent, or Firm*—Cushman, Darby & Cushman

[57] ABSTRACT

A voltage regulator of a generator for vehicles includes an excitation control circuit for controlling the initial excitation of the generator and the full excitation succeeding to the initial excitation. The excitation control circuit also includes an indication lamp for indicating whether the generator is in a generating state or not. A generator output detecting circuit has a single input terminal to receive an output voltage developed in a stator winding of the generator and compares the output voltage respectively with a first reference level corresponding to an initial voltage build-up and a second reference level higher than the first reference level.

An on-off control signal producing circuit produces an on-off control signal having a predetermined duty ratio and delivers the on-off control signal to the excitation control circuit until the output voltage of the generator reaches the first reference level, that is, during the initial excitation stage, thereby to excite the field winding intermittently with the predetermined duty ratio. When the output voltage of the generator reaches the second reference level, the indication lamp is extinguished to indicate that the generator is now in the generating state.

4 Claims, 3 Drawing Figures

4,362,982

VOLTAGE REGULATOR FOR VEHICLES

BACKGROUND OF THE INVENTION

The present invention relates to voltage regulators for vehicles, and more particularly the invention relates to a voltage regulator for vehicles having an initial excitation function and a generation indicating function.

There is known in the prior art a type of vehicle voltage regulator having an initial excitation function for the generator and also incoporating a generator power generation indicating function to meet the requirement for a reduction in the size. However, this type of voltage regulator has been so designed that the detection of the generated output of the generator for the control of initial excitation and that for the control of generation indication (the indication is effected by turning on an indicator lamp for the time interval between the closing of the ignition switch and the time that the generated voltage of the generator reaches a predetermined value) are accomplised by means of separate circuit. However, the detection of generated output for the control of initial excitation and that for the control of generation indication are related to each other and also it is desirable to effect the detection by a common detecting circuit for the purpose of reducing the size of the voltage regulator.

A common detecting circuit of this type has been proposed in which the output voltage of the generator is detected with respect to a predetermined reference voltage so that when the output voltage is lower than the reference level, it is determined that the generator is not generating so that the generation indicator lamp is turned on and the excitation current for initial excitation purposes is continuously supplied to the field winding, whereas when the output voltage is higher than the reference level, it is determined that the generator is generating so that a change-over from the initial excitation to the full excitation is effected and simultaneously the generation indicator lamp is turned off. Also, in this case, both the change-over from the initial excitation to the full excitation and the turning off of the generation indicator lamp are effected on the basis of the same level of the generated voltage, thus giving rise to the following disadvantages. In other words, in order to effect the change-over from the initial excitation to the full excitation, in view of the rising of the generated voltage of the generator, during the starting period the rotational speed of the generator must for example be 1,000 rpm so that at that time the output voltage peak value (at the terminal P of the generator) becomes 2 to 3 V and thus it is only necessary to detect the level of 2 to 3 V and thereby to effect the control. On the other hand, in order to effect the control of generation indication, even if the generator stops generating due to the interruption of the current flow in the field winding caused by such abnormal condition as a break or short-circuiting of the generator field winding, for example, the residual magnetism or the like causes a certain output voltage (e.g., about 3 V at 6,000 rpm and about 4.5 V at 10,000 rpm), so that the generation indicator lamp is turned off and the proper generation indicating function is not performed. This also results in loss of the abnormality warning function for informing the occurrence of such faulty condition.

SUMMARY OF THE INVENTION

With a view to overcoming the foregoing deficiencies in the prior art, it is the object of the present invention to provide an improved voltage regulator including a generated output detecting circuit which is capable of giving the proper generation indication in the event of a faulty condition such as a break in the field winding of a generator and which is compatible with the control of initial excitation.

In accordance with the present invention, there is thus provided a voltage regulator including a detecting circuit which receives the output voltage of a generator as a single input to detect two different generated output levels and generate different detection signals for the purpose of initial excitation control and generation indication, respectively. More specifically, the detecting circuit is designed so that in response to the rising of a generated output or at the start of power generation a suitable low output level is detected to generate a detection signal for initial excitation control purposes and on the other hand a detection signal for generation indication purposes is generated by detecting another output level which is so high that there is no danger of being detected mistakenly for the generating condition even in the case of the non-generating condition of the generator due to a break, short-circuiting or the like of the field winding, As a result, the suitable detection signals for the control of initial excitation and the control of generation indication, respectively, can be generated by means of the single generated output detecting circuit and also the proper generation indication can be effected without the danger of mistakenly detecting the non-generating condition of the generator for the generating condition.

DESCRIPTION OF THE PREFERRED EMBODIMENT

Figure 1:
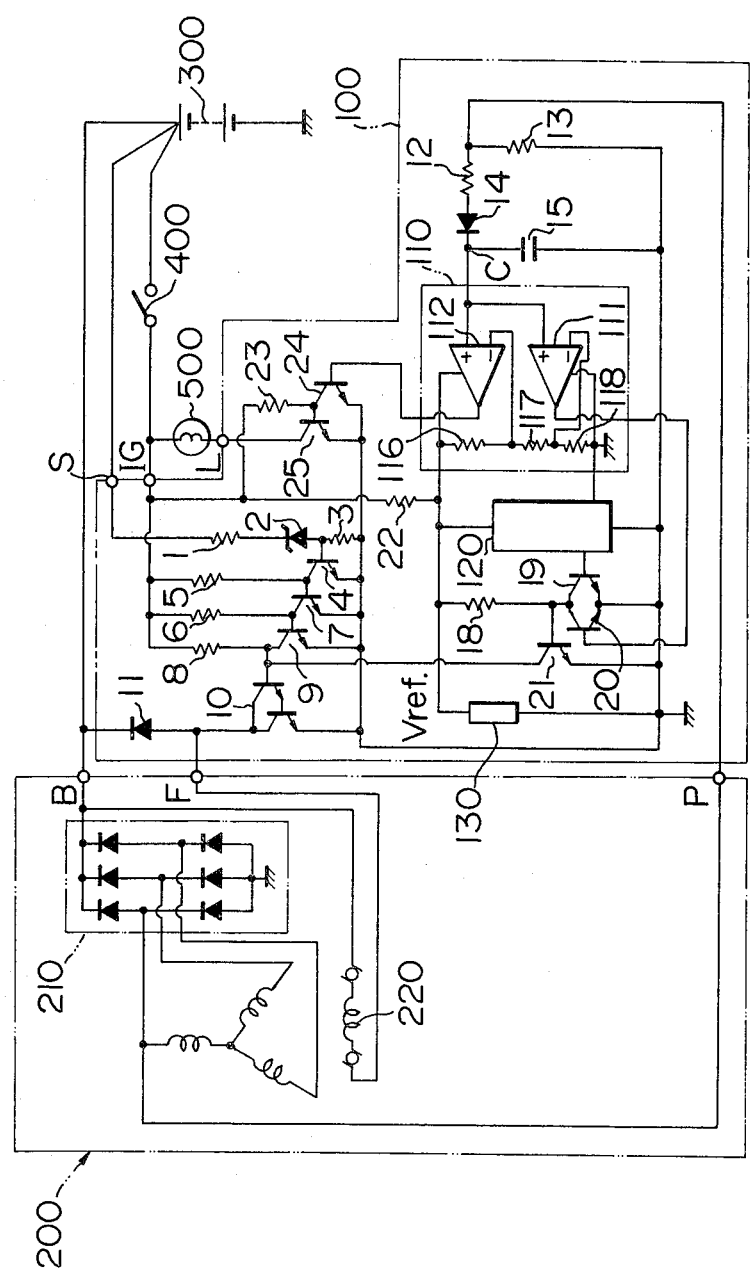
FIG. 1 is a circuit diagram of a battery charging system comprising a voltage regulator according to the present invention and a known type of generator.

The present invention will now be described in greater detail with reference to the illustrated embodiment. FIG. 1 shows a voltage regulator according to the invention and an AC generator and a rectifier which are associated with the voltage regulator. The voltage regulator 100 has an initial exciting function and a generation indicating function and it includes a generated output detecting circuit 110 for controlling these functions. The voltage regulator 100 further includes a circuit comprising a resistor 1, a Zener diode 2 and a resistor 3 for detecting whether the voltage adjusting regulating voltage of the voltage regulator is lower or higher than the voltage of a battery 300 at the beginning of the initial excitation and after the change-over from the initial excitation to the full excitation and a series of transistors 4, 7, 9 and 10 which are turned on or off in response to the results of the detections, whereby an initial excitation current flows from the battery 300 to a generator field winding 220 when the battery voltage is lower than the regulating voltage. There are further included an exciting oscillator circuit 120 and transistors 19, 20 and 21 for respectively supplying a control signal and an oscillation signal to the transistor pair 10 so as to intermittently control the flow of the excitation current at a predetermined duty cycle in the initial excitation condition. To serve the generation indicating function, there is further included a circuit comprising transistors 24 and 25 for operating an indicator lamp 500 forming indicator means in response to the detection signal of the generated output detecting circuit 110. The generated output detecting circuit 110 receives its input via resistors 12 and 13, a diode 14 and a capacitor 15 which smooth the output voltage of a generator 200, and the circuit 110 comprises a voltage dividing circuit including resistors 116, 117 and 118 for providing two different reference voltage levels and comparators 111 and 112 for respectively comparing the two different reference voltage levels with the generator output voltage. The voltage dividing circuit is supplied with a fixed voltage Vref preset by a voltage regulating circuit 130.

The operation of the embodiment will now be described. When an ignition switch 400 is closed, the voltage of the battery 300 is applied via the terminal S of the voltage regulator 100 to the circuit including the Zener diode 2 preset to the predetermined regulating voltage and at this time to battery voltage is lower than the regulating voltage since there is no generated output from the generator 200 as yet. Thus, no current flows to the base of the transistor 4 turning it off so that the transistor 7 is turned on, the transistor 9 is turned off and the transistor pair 10 is turned on. When this occurs, the current flows from the battery 300 to the field winding 220 via the terminal B of the generator 200 and the current returns from the terminal F to the grounded side of the battery 300 via the transistor pair 10. If this initial excitation allows the starter (not shown) to cause the generator 200 to start rotating, the generator 200 will start generating power. Thus, in view of the fact that it is only necessary to supply a current of about several hundreds mA to the field winding 220 for starting the power generation and that it is necessary to prevent leakage current if the ignition switch 400 is left to stay on due to inadvertent failure to turn it off, the transistor pair 10 is intermittently controlled at the predetermined duty cycle (duty-cycle control) so as to limit the current flowing in the field winding 220 at a small value. This stage is the initial excitation stage, and on the other hand the output voltage of the generator 200 is applied via the terminal P and the smoothing circuit to the input terminal C as an input to the comparators 111 and 112 in the output voltage detecting circuit 110. In this case, since the generator output voltage is still lower than the lower reference voltage (e.g., 2 to 3 V), the comparator 111 generates no detection signal so that the transistor 20 is turned off and the on-off signal from the exciting oscillator circuit 120 is transmitted to the transistor pair 10 via the transistors 19 and 21, thus intermittently supplying the previously mentioned excitation current. In this case, since the transistor 9 is off as mentioned previously, the transmission of the on-off signal from the oscillator circuit 120 is affected in no way.

Also, no detection signal is generated from the comparator 111 adapted to detect the higher output voltage level of 8 to 9 V, for example, and consequently in the generation indicator drive circuit the transistor 24 is turned off and thus the transistor 25 is turned on. Thus, the generation indicator lamp 500 is turned on indicating that the generator is not in a generating state.

Then, as the output voltage of the generator 200 increases so that it exceeds the lower output detection level, the detection signal from the comparator 111 is applied to the base of the transistor 20 so that the transistor 20 is turned on interrupting the transmission of the on-off signal from the oscillator circuit 120 and also the transistor 21 is turned off. As a result, the transistor pair 10 is not controlled by the duty-cycle controlling signal of the initial excitation stage and the stage of full excitation is reached. As a result, the transistor pair 10 is intermittently controlled depending on whether the battery voltage is higher or lower than the predetermined regulating voltage and the voltage of the battery 300 charged by the generator 200 is controlled so as to be maintained at the predetermined regulating voltage. More specifically, if the battery voltage is lower than the predetermined regulating voltage, the operation takes place in such a manner that no current flows via the Zener diode 2 such that the transistor 4 is turned off, the transistor 7 is turned on, the transistor 9 is turned off and the transistor pair 10 is turned on, thus supplying the current to the field winding 220 and thereby increasing the battery voltage. On the contrary, if the battery voltage becomes higher than the predetermined regulating voltage, the operation takes place in such a manner that the current flows via the Zener diode 2 so that the transistor 4 is turned on, the transistor 7 is turned off, the transistor 9 is turned on and the transistor pair 10 is turned off, thus interrupting the current flow in the field winding 220 and thereby decreasing the battery voltage. This cycle of operations is repeated so that the battery voltage is always maintained at the predetermined regulating voltage.

When the output voltage of the generator 200 rises further so that the voltage applied to the input terminal C of the comparators 111 and 112 exceeds the detection level for generation indication control purposes, a detection signal is also generated from the comparator 112 and the signal is applied to the base of the transistor 24. As a result, the transistor 24 is turned on and the transistor 25 is turned off. Thus, the generation indicator lamp 500 connected in series with the collector-emitter section of the transistor 25 is turned off, thus indicating that the generator is now generating.

Next, consider the case where there is a break or the like in the generator field winding 220. In this case, there is no excitation current flow and a non-generating state must be indicated as the generation indication. In fact, however, an output proportional to the generator speed is produced at the generator output terminal P by the residual magnetism, etc., and this output voltage amounts for example to about 2 to 3 V at 5,000 to 6,000 rpm. Thus, a detection signal is also generated from the comparator 111 adapted to detect the lower detection level for initial excitation control purposes. Thus, with the voltage regulator of the type in which the detection signal from the comparator 111 is also used for generation indication control purposes, this non-generating state is mistaken for the generating state and the generation indicator lamp 500 is turned off, thus failing to give a warning of any faulty condition such as a break in the field winding. In accordance with the present invention, however, the other comparator 112 is preset to the detection level which is higher than the output voltage that can be generated at the maximum generator speed of 12,000 rpm without the initial excitation current and thus there is no danger of mistakenly detecting the non-generating state for the generating state.

Figure 2:
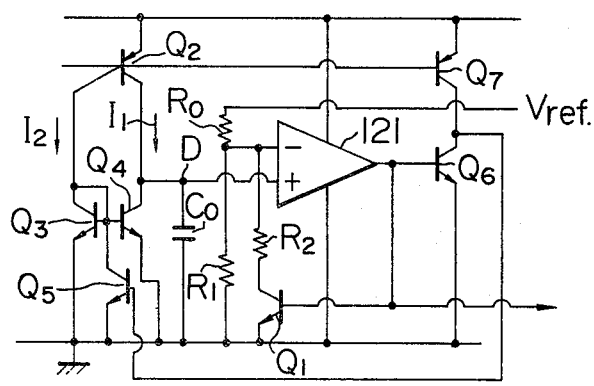
FIG. 2 is a circuit diagram of the exciting oscillator circuit in the voltage regulator of FIG. 1.
Figure 3:
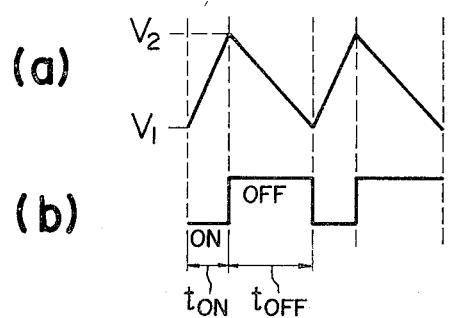
FIG. 3 shows waveforms useful for explaining the operation of the oscillator circuit shown in FIG. 2.

FIG. 2 is a circuit diagram of the exciting oscillator circuit 120 adapted to generate an on-off signal having a predetermined duty cycle for the previously mentioned duty-cycle control of the initial excitation. The oscillator circuit 120 includes a comparator 121 whose inverting terminal is selectively supplied with two reference voltages $V_1$ and $V_2$ produced by dividing the reference voltage Vref by a voltage divider circuit comprising resistors $R_0$, $R_1$ and $R_2$ and by a change-over between the removal and insertion of the resistor $R_2$. Applied to the noninverting terminal of the comparator 121 is the signal generated at a point D and having a sawtooth waveform as shown in (a) of FIG. 3. This signal is generated at the point D in response to the discharging with $I_2 - I_1$ of a capacitor $C_0$ which was charged with the constant current $I_1$ via a transistor $Q_5$ whose on-off operations where controlled in association with the output of the comparator 121 and in response to the on-off operations of a pair of transistors $Q_3$ and $Q_4$ which are controlled via the transistor $Q_5$. More specifically, when the transistor $Q_5$ is turned on, the transistors $Q_3$ and $Q_4$ are turned off and the capacitor $C_0$ is charged with the constant current $I_1$. When the transistor $Q_5$ is turned off, the transistors $Q_3$ and $Q_4$ are turned off so that the constant currents $I_1$ and $I_2$ ($I_2 > I_1$) respectively flow through the transistors $Q_3$ and $Q_4$ and each of the transistors $Q_3$ and $Q_4$ pulls the current of the other transistor by the current mirror effect, thus causing the capacitor $C_0$ to discharge with a current ($I_2 - I_1$). The previously mentioned sawtooth wave signal is generated at the point D by the charging and discharging of the capacitor $C_0$ with these currents. As a result, the oscillator circuit 120 generates at its output terminal an on-off signal having a predetermined duty cycle as shown in (b) of FIG. 3 and the "on" and "off" periods are respectively determined as follows $$t_{ON} = C(V_2 - V_1)/I_1$$

and $$t_{OFF} = C(V_2 - V_1)/(I_2 - I_1)$$

Thus, by suitably selecting the reference voltages $V_1$ and $V_2$ to the inverting terrminal of the comparator 121, the capacity of the capacitor $C_0$ and the magnitudes of the constant currents $I_1$ and $I_2$, it is possible to obtain the desired "on" and "off" periods (or the desired duty cycle). The output on-off signal of the oscillator circuit 120 is applied via the transistors 19, 21 and 10 to the field winding terminal F of the generator 200 as mentioned previously.

It will thus be seen from the foregoing description that in accordance with the present invention, a circuit for detecting the generated output of a generator includes a single input terminal and detects two different detection levels for the control of initial excitation and the control of generation indication, respectively. Namely, one on side, a suitable output level is detected such that the initial excitation is controlled until such a level of power generation which optimizes the commencement of power generation (or the starting) of the generator, and on the other hand, another output level is detected to eliminate the danger of mistakenly detecting the non-generating state due to a break, short-circuiting, or the like of the field winding for the generating state, thus providing a voltage regulator capable of always stably serving an initial excitation function and a generation indicating function irrespective of whether the generator is in the normal operation or in the faulty condition.

We claim:

1. A battery charging system for vehicles comprising:
   an A.C. generator;
   a rectifier for rectifying the output of said A.C. generator;
   a battery charged from the output of said rectifier; and
   a voltage regulator for regulating the output of said A.C. generator;
   said regulator including,
   means for controlling the excitation of a field winding of said generator, said controlling means controlling a current flow to the field winding by detecting a voltage level of said battery, the current being supplied to said field winding from said battery and through an ignition switch at an initial excitation stage and the current being supplied from said generator through said rectifier at a full excitation stage succeeding to the initial excitation stage,
   means for detecting an output voltage level of said generator, said detecting means having a single input terminal connected to an output terminal of a stator winding of said generator and producing first and second detection signals when said generator output voltage respectively reaches first and second predetermined reference levels,
   means for providing an on-off control signal of a predetermined duty ratio to said excitation control means, said on-off control signal providing means having an input terminal to receive said first detection signal from said detecting means to continuously deliver said on-off control signal to said excitation control means until said first detection signal is received, thereby to supply the current to said field-winding intermittently at said predetermined duty ratio, and
   means for indicating a generating state of said generator in response to said second detection signal from said detecting means, said indicating means indicating that said generator is not in a normal generating state until said second detection signal is received.

2. A system according to claim 1, wherein said detecting means includes first and second comparator circuits to respectively compare said generator output voltage with said first and second predetermined reference levels, said first reference level corresponding to an initial voltage build-up in said stator winding and said second reference level corresponding to a voltage level higher than said first reference level and higher than a possible voltage build-up in case of malfunction of said stator winding.

3. A system according to claim 1, wherein said on-off control signal providing means includes an oscillation circuit to produce the on-off control signal and includes a switching circuit controlled by said first detection signal from said detecting means, said on-off control signal being delivered to said excitation control means through said switching circuit until said switching circuit is turned off by said first detection signal.

4. A battery charging system comprising:
   an A.C. generator having a field coil and a generating coil;
   a rectifier for rectifying the output of said A.C. generator;
   a battery charged from the output of said rectifier;

a lamp for indicating an abnormal condition of said battery charging system;

a voltage regulator for regulating the output of said A.C. generator;

said voltage regulator including, first comparison means inputted with an output voltage of said A.C. generator and comparing said inputted voltage with a first reference value, means for controlling an initial excitation of said field coil in accordance with a comparison result of said comparison means, second comparison means inputted with the same output voltage of said A.C. generator as the one supplied to said first comparison means and comparing said inputted voltage with a second reference value different from said first reference value, and means for controlling the lighting or extinguishing of said lamp in accordance with a comparison result of said second comparison means.

* * * * *